United States Patent [19]

Kress

[11] Patent Number: 4,596,498

[45] Date of Patent: Jun. 24, 1986

[54] SINGLE BIT REAMER WITH IMPROVED GUIDE MEMBERS

[75] Inventor: Dieter Kress, Aalen, Fed. Rep. of Germany

[73] Assignee: MAPAL Fabrik für Präzisions werkzeuge Dr. Kress KG, Aalen, Fed. Rep. of Germany

[21] Appl. No.: 512,988

[22] Filed: Jul. 12, 1983

[30] Foreign Application Priority Data

Jul. 17, 1982 [DE] Fed. Rep. of Germany ....... 3226799

[51] Int. Cl.⁴ ............................................. B23B 51/00
[52] U.S. Cl. ....................................... 408/83; 408/200; 408/226; 408/713
[58] Field of Search .............. 408/199, 200, 114, 226, 408/227, 713, 715, 59, 83, 79, 80, 81, 82, 114, 705; 175/325, 292, 408

[56] References Cited

U.S. PATENT DOCUMENTS

| | | | |
|---|---|---|---|
| 2,207,861 | 7/1940 | Healy | 408/83 |
| 2,257,609 | 9/1941 | Kollath | 408/83 X |
| 3,033,062 | 5/1962 | Carlstedt | 408/83 X |
| 3,191,463 | 6/1965 | Ladendors | 408/200 X |
| 3,314,314 | 4/1967 | Halpern | 408/57 |
| 3,658,434 | 4/1972 | Benjamin et al. | 408/200 |
| 3,751,177 | 8/1973 | Faber | 408/226 X |
| 3,762,828 | 10/1973 | Faber | 408/83 |
| 3,816,018 | 6/1974 | Hlocky | 408/713 V |
| 3,998,566 | 12/1976 | Williams | 408/227 X |
| 4,096,771 | 6/1978 | Monro | 408/83 X |
| 4,108,567 | 8/1978 | Faber | 408/226 X |
| 4,133,399 | 1/1979 | Herrman | 408/713 X |
| 4,184,794 | 1/1980 | Henninghaus | 408/834 |
| 4,225,274 | 9/1980 | Katz | 408/239 X |
| 4,240,770 | 12/1980 | Berstein | 408/83 |

Primary Examiner—Eugene F. Desmond
Assistant Examiner—Glenn L. Webb
Attorney, Agent, or Firm—Erwin S. Teltscher

[57] ABSTRACT

The operating life of the two guide members in a single bit reamer is increased by shaping the peripheral surface of the guide members with a radius of curvature less than the radius of the bore being machined. Contact between each guide member and the bore wall takes place only along a central quest area extending in the lengthwise direction of each guide member. This allows coating of the peripheral surfaces of the guide members with a hard, wear resistant material. Further, the guide members may be fastened to the cutter head by means of a screw situated in a groove extending in the tangential direction along the peripheral surface of each guide member. This increases the lubricating and cooling effect.

13 Claims, 3 Drawing Figures

SINGLE BIT REAMER WITH IMPROVED GUIDE MEMBERS

FIELD OF THE INVENTION

In reamers of this type, the first guide member is usually mounted in the quadrant directly following the single bit in the direction of rotation of the cutter head, while the second guide member is diametrically opposite the bit. The cutting edge of the bit extends slightly over the circle of rotation of the guide members in the radial direction.

In prior art reamers, the cylindrical outer surface of each of the guide members has a radius of curvature equal to the radius of the bore being reamed. However, the position relative to the wall of the bore of the two guide members is not the same. The first guide member, that immediately following the bit in the direction of the rotation of the tool, makes contact with the wall of the bore with its trailing edge and the outer surface immediately adjacent thereto. For the second guide member, contact with the bore wall is established by the leading edge and its immediately adjacent surface. This is illustrated in FIG. 1.

The high pressure created at the contacting edges of guide members arranged and constructed as described above causes considerable wear at the contact surfaces. Particularly for the guide member making contact with its leading edge, the lubricating film is sheared off even at relatively low cutting pressures, thereby increasing the wear even more.

For reamers constructed as described above, it is impossible to decrease wear of the guide members by application of a layer of mechanically resistant material, since these layers tend to wear away rapidly, first at the contact edges and then in the areas immediately adjacent such edges.

SUMMARY OF THE INVENTION

It is an object of the present invention to furnish a reamer whose guide members are so arranged and constructed that pressure on the contact edges is avoided and the useful life of th guide members substantially increased.

In accordance with the present invention, the first and second guide member each has a cylindrical outer surface, the radius of curvature of the cylindrical outer surface being less than that of the bore. Further, the guide members are so arranged that contact with the bore wall is established in the central portion of the circumferential surface, rather than at either the leading or trailing edges. This construction and arrangement itself results in a great decrease in wear. Further, it allows a wear resistant coating, such as TIC-TIN or a ceramic coating, to be applied to the contact surface, without danger that such a coating will break off or will wear away rapidly. This again increases the operating life of the guid members.

In a preferred embodiment, the guide members are detachably mounted on the cutter head. Preferably, the guide members then have a groove extending in the circumferential direction, and are fastened to the cutter head by means of a screw located in the groove.

The novel features which are considered as characteristic for the invention are set forth in particular in the appended claims. The invention itself, however, both as to its construction and its method of operation, together with additional objects and advantages thereof will best be understood from the following description of specific embodiments when read in connection with the accompanying drawing.

DESCRIPTION OF THE PREFERRED EMBODIMENT

Figure 1:
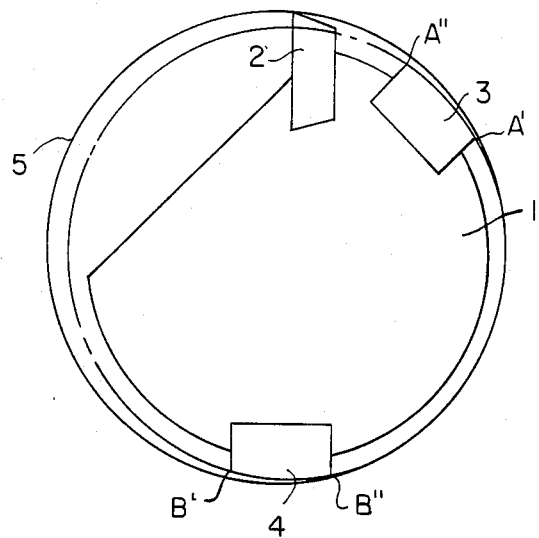
FIG. 1 illustrates the position of the guide members in the bore in accordance with the state of the art.

In FIG. 1, a cutter head is denoted by reference numeral 1. The cutting edge of a cutting bit 2, fastened to the cutter head by a clamping jaw 6, rotates in a circle having a slightly larger radius than the radius of rotation of guide members 3 and 4. The position of cutting head 1 within bore 5 during reaming is pictured in a somewhat exaggerated fashion in FIG. 1. For this adjustment of the cutter head, guide member 3 makes contact with the wall of the bore at its trailing edge A' seen in the direction of rotation. A gap is thus formed between the leading edge A" and the wall of the bore, the gap being wedge-shaped and decreasing in the direction of the trailing edge. On the other hand, the leading edge B" of guide member 4 makes contact with the bore wall. The lubricating film is therefore sheared off in the vicinity of this leading edge, causing increased wear of the guide member.

Figure 2:
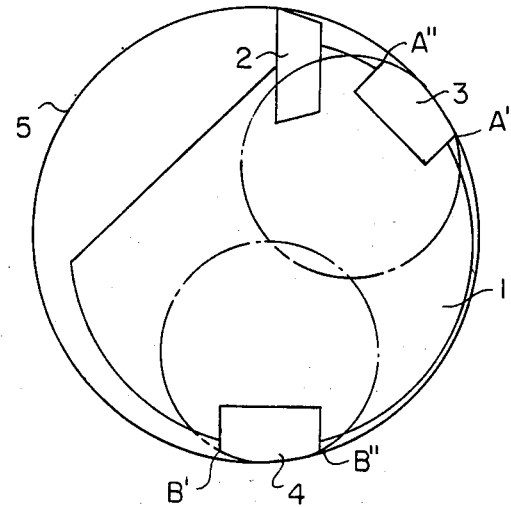
FIG. 2 shows the arrangement of the guide members in a reamer according to the present invention.
Figure 3:
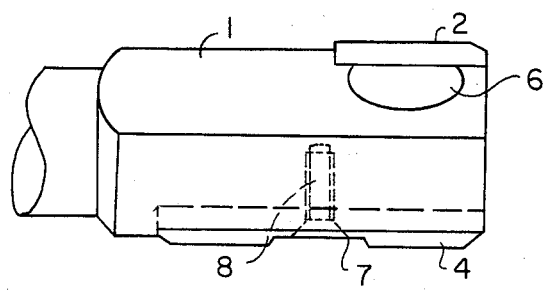
FIG. 3 is a side view of the cutter head of the reamer of the present invention.

The high surface pressure created at the edges of the guide members in the prior art reamers is prevented in reamers according to the present invention by the construction and arrangement illustrated in FIG. 2. In this arrangement, the radius of curvature of the peripheral surface of the guide members is less than that of the bore, and contact between the wall of the bore and the guide members is made in the central area viewed in the direction of rotation, rather than at the leading or trailing edge. A lubricating film can thus form in the wedge-shaped space formed between the leading edge and the central contact surface of each guide member. This film obviates the danger that a wear resistant coating, such as TIC-TIN or a ceramic coating, may break off. Such a coating can therefore be applied, greatly increasing the operating life of the guide members.

An additional advantage of the present invention is that the trailing edges (A', B') are also not subjected to wear. Thus, if a guide member has a lead at both its leading and trailing edges, and is not permanently fastened to the cutter head, it is possible to turn it by 180° and continue its use. For this purpose, the guide members are fastened to cutter head 1 by a screw 8. Preferably, the guide member has a groove 7 which extends over its circumference, and the screw is located in this region. This inoreases both the lubicating and the cooling effect.

In a preferred embodiment, for a bore having a radius of 0,5 inch the radius of curvature of the peripheral surface of the guide members is 0,45 inch.

While the invention has been illustrated in a preferred embodiment, it is not to be limited to the arrangements and structures shown, since many variations thereof will be evident to one skilled in the art and are intended to be encompassed in the present invention as set forth in the following claims.

I claim:

1. In a reamer having a cutter head rotating in a predetermined direction of rotation about a tool axis and a bit mounted in said cutter head for machining a bore bounded by a bore wall at a given distance from said tool axis, said bit having a main cutting edge initiating said machining, the improvement comprising:

at least one elongated guide member mounted for roation with said cutter head, said elongated guide member having a lengthwise dimension extending in a direction parallel to said tool axis, and an outer surface making contact with said bore wall only at a substantially central portion thereof in said direction of rotation, said outer surface having a radius of curvature slightly less than said given distance between said bore wall and said tool axis,and means for fastening said guide member irrotatably to said cutter head in a first position.

2. A reamer as set forth in claim 1, further comprising a wear resistant coating on said guide member.

3. A reamer as set forth in claim 1, further comprising means for fastening said guide member releasably to said cutter head.

4. A reamer as set forth in claim 1, wherein said at least one guide member comprises a first and second guide member.

5. A mreamer as set forth in claim 3, wherein said guide member is formed symmetrically relative to a central radial cross section thereof.

6. A reamer as set forth in claim 1, wherein said guide member has a leading and a trailing edge in the direction of rotation, and a lead at each of said edges, and wherein said means for fastening said guide member irrotatably to said cutter head include means for releasing said guide member from being fastened to said cutter head, and means for refastening said guide member to said cutter head in a second position turned around by 180° from said first position, whereby the life of said guide member is increased.

7. In a reamer having a cutter head rotating in a predetermined direction of rotation about a tool axis and a bit mounted in said cutter head for machining a bore bounded by a bore wall at a given distance from said tool axis, said bit having a main cutting edge initiating said machining, the improvement comprising:

at least one elongated guide member mounted for rotation with said cutter head, said elongated guide member having a lengthwise dimension extending in a direction parallel to said tool axis, being formed symmetrically relative to a central radial cross-section thereof, having a leading and a trailing edge in the direction of rotation, and a lead at each of said edges, said leading edge engaging said bore wall substantially simultaneously with said main cutting edge of said bit, and an outer surface making contact with said bore wall only at a substantially central portion thereof in said direction of rotation, said outer surface having a radius of curvature slightly less than said given distance between said bore wall and said tool axis, and means for fastening said guide member releasably to said cutter head.

8. In a reamer having a cutter head rotating in a predetermined direction of rotation about a tool axis and a bit mounted in said cutter head for machining a bore bounded by a bore wall at a given distance from said tool axis, said bit having a main cutting edge initiating said machining, the improvement comprising:

at least one elongated guide member mounted for rotation with said cutter head, said elongated guide member having a lengthwise dimension extending in a direction parallel to said tool axis, being formed symmetrically relative to a central radial cross-section thereof, having a leading and a trailing edge in the direction of rotation, a lead at each of said edges, and an outer surface making contact with said bore wall only at a substantially central portion thereof in said direction of rotation, said outer surface having a radius of curvature slightly less than said given distance between said bore wall and said tool axis, and means for fastening said guide member releasably to said cutter head in a first position.

9. A reamer as set forth in claim 8, wherein a wedge-shaped space is formed between said leading edge, said outer surface, and said bore wall, and further comprising a lubricating film formed in said wedge-shaped space.

10. A reamer as set forth in claim 8, wherein said at least one guide member includes first and second guide members.

11. A reamer as set forth in claim 8, wherein said means for fastening said guide member to said cutter head include means for refastening said guide member to said cutter head in a second position turned around by 180° from said first position, whereby the life of said guide member is increased.

12. A reamer as set forth in claim 8, wherein said means for releasably fastening said guide member to said cutter head comprises a screw.

13. A reamer as set forth in claim 12, wherein said guide member has a groove extending tangentially in the peripheral portion thereof; and wherein said screw is located in said groove.

* * * * *